US010629009B2

(12) United States Patent
Chan et al.

(10) Patent No.: US 10,629,009 B2
(45) Date of Patent: Apr. 21, 2020

(54) NON-INTRUSIVE UNMANNED ENTITY INSPECTION

(71) Applicant: International Business Machines Corporation, Armonk, NY (US)

(72) Inventors: Yuk L. Chan, Rochester, NY (US); Eileen P. Tedesco, Sharon, CT (US); Kyle Gilbertson, Rochester, MN (US); Daniel F. Hogerty, Somerville, NJ (US); Lawrence A. Clevenger, Saratoga Springs, NY (US); Benjamin D. Briggs, Waterford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/961,924

(22) Filed: Apr. 25, 2018

(65) Prior Publication Data
US 2019/0333292 A1    Oct. 31, 2019

(51) Int. Cl.
| G07C 5/08 | (2006.01) |
| G05D 1/00 | (2006.01) |
| G06T 7/00 | (2017.01) |
| G06K 9/00 | (2006.01) |
| G06K 9/62 | (2006.01) |
| B60L 3/12 | (2006.01) |
| B60L 58/16 | (2019.01) |

(52) U.S. Cl.
CPC ............ *G07C 5/0808* (2013.01); *B60L 3/12* (2013.01); *B60L 58/16* (2019.02); *G05D 1/0055* (2013.01); *G06K 9/00624* (2013.01); *G06K 9/6202* (2013.01); *G06T 7/0008* (2013.01)

(58) Field of Classification Search
CPC ............ G07C 5/0808; G06K 9/00624; G06K 9/6202; G06T 7/0008; G05D 1/0055; B60L 58/16; B60L 3/12
See application file for complete search history.

(56) References Cited

U.S. PATENT DOCUMENTS

| 5,515,732 A | 5/1996 | Willcox et al. |
| 5,521,817 A | 5/1996 | Burdoin et al. |
| 7,259,357 B2 | 8/2007 | Walker |
| 7,650,210 B2 * | 1/2010 | Breed ............... B60W 50/0205 701/29.1 |

(Continued)

FOREIGN PATENT DOCUMENTS

| CN | 105785876 A | 7/2016 |
| JP | 08313390 A | 11/1996 |
| KR | 102017060973 A | 6/2017 |

OTHER PUBLICATIONS

HD Electric Company, "Welcome to HD Electric Company", printed Aug. 18, 2017, 3 pages.

(Continued)

*Primary Examiner* — Behrang Badii
*Assistant Examiner* — Daniel L Greene
(74) *Attorney, Agent, or Firm* — Nolan M. Lawrence

(57) ABSTRACT

An unmanned vehicle is identified. One or more specifications of the unmanned vehicle are retrieved in response to the identification. A first characteristic of the unmanned vehicle is observed. The observed first characteristic is compared to the retrieved specifications. A compliance standard of the unmanned vehicle is determined. The determination is based on the comparison.

20 Claims, 5 Drawing Sheets

(56) References Cited

U.S. PATENT DOCUMENTS

| | | | |
|---|---|---|---|
| 7,869,944 B2 * | 1/2011 | Deaton | G01C 15/00 |
| | | | 701/491 |
| 8,418,530 B1 | 4/2013 | Scaringe et al. | |
| 8,908,573 B1 | 12/2014 | Wang et al. | |
| 8,973,075 B1 | 3/2015 | Willis et al. | |
| 9,059,189 B2 | 6/2015 | Keller, III et al. | |
| 9,412,278 B1 | 8/2016 | Gong et al. | |
| 9,469,394 B2 | 10/2016 | Vaughn et al. | |
| 9,524,648 B1 | 12/2016 | Gopalakrishnan et al. | |
| 9,609,288 B1 * | 3/2017 | Richman | H04N 7/183 |
| 9,618,940 B1 * | 4/2017 | Michini | H04N 7/183 |
| 9,778,135 B1 | 10/2017 | Beckman et al. | |
| 2003/0152753 A1 | 8/2003 | Waller | |
| 2006/0060123 A1 * | 3/2006 | Harrie | B63C 11/26 |
| | | | 114/221 R |
| 2011/0092726 A1 | 4/2011 | Clarke | |
| 2012/0083959 A1 * | 4/2012 | Dolgov | G05D 1/0214 |
| | | | 701/23 |
| 2012/0265380 A1 * | 10/2012 | Kuwata | G05D 1/0206 |
| | | | 701/21 |
| 2014/0173338 A1 | 6/2014 | Arroyo et al. | |
| 2014/0380425 A1 | 12/2014 | Lockett et al. | |
| 2015/0239365 A1 * | 8/2015 | Hyde | B60L 11/1861 |
| | | | 701/2 |
| 2015/0242972 A1 | 8/2015 | Lemmey et al. | |
| 2015/0350914 A1 | 12/2015 | Baxley et al. | |
| 2016/0047855 A1 | 2/2016 | Bhunia et al. | |
| 2016/0068264 A1 | 3/2016 | Ganesh et al. | |
| 2016/0112083 A1 | 4/2016 | Keller, III et al. | |
| 2017/0084181 A1 * | 3/2017 | Wilson | G08G 5/0069 |
| 2017/0171868 A1 | 6/2017 | Reis et al. | |
| 2017/0188372 A1 | 6/2017 | Reis et al. | |
| 2017/0188377 A1 | 6/2017 | Reis et al. | |
| 2017/0197731 A1 | 7/2017 | Yang et al. | |
| 2017/0253330 A1 | 9/2017 | Saigh et al. | |
| 2017/0282362 A1 * | 10/2017 | Erhart | B25J 11/008 |
| 2017/0282371 A1 * | 10/2017 | Erhart | B25J 9/1679 |
| 2018/0039272 A1 | 2/2018 | Seydoux et al. | |
| 2018/0091908 A1 | 3/2018 | Goel et al. | |
| 2018/0151045 A1 * | 5/2018 | Kim | B64C 39/024 |
| 2018/0260626 A1 * | 9/2018 | Pestun | G06K 9/00637 |
| 2018/0316416 A1 | 11/2018 | Reis et al. | |

OTHER PUBLICATIONS

Grainger, "Electric and Magnetic Fields (EMF)", Quick Tips Technical Resources—Productivity, Quick Tips #344, printed Aug. 18, 2017, 3 pages.

Unknown, "EMF in Your Environment—Magnetic Field Measurements of Everyday Electrical Devices", United States Environmental Protection Agency, Office of Radiation and Indoor Air, Dec. 1992, 36 pages.

Arora, M., "Don't trust your tamper detection circuitry, it may be dumb?", EDN Network, Jul. 26, 2012, 5 pages.

Perritt et al., "Making civilian drones safe: performance standards, self-certification, and post-sale data collection", Northwestern Journal of Technology and Intellectual Property, vol. 14 | Issue 1, Article 1, 2016, 37 pages.

Paces et al., "Independent Global Monitoring System for Remotely Piloted Aircraft", IEEE/AIAA 35th Digital Avionics Systems Conference (DASC), Sep. 25-29, 2016, 9 pages.

Cerf, V., "Prospects for the Internet of Things", XRDS, Winter 2015, vol. 22, No. 2, 4 pages.

Fievre, A., "Uniquely Identifiable Tamper-Evident Device Using Coupling between Subwavelength Gratings", FIU Electronic Theses and Dissertations, Mar. 27, 2015, 147 pages.

Chan et al., "Non-Intrusive Unmanned Entity Inspection", U.S. Appl. No. 15/961,932, filed Apr. 25, 2018.

IBM, List of IBM Patents or Patent Applications Treated as Related, Apr. 24, 2018, 2 pages.

\* cited by examiner

NON-INTRUSIVE UNMANNED ENTITY INSPECTION

BACKGROUND

The present disclosure relates to unmanned entities (alternatively, drones), and more specifically, to the inspection, verification, and self-verification of drones for compliance based on observed drone operation.

Drones operate in many use cases and situations. Drones may be used in construction and cartography, such as providing aerial additional viewpoints of buildings and the exploration of various natural terrains. Drones may be used in safety and rescue, such as extending the reach of supplies and communications to remote or hazardous areas. Drones may be used in commercial or retail industries, such as the delivery of packages. Drones may be used in agricultural endeavors, such as the care and inspection of crops.

SUMMARY

According to embodiments of the present disclosure, aspects include a method, system, and computer program product. An unmanned vehicle is identified. One or more specifications of the unmanned vehicle are retrieved in response to the identification. A first characteristic of the unmanned vehicle is observed. The observed first characteristic is compared to the retrieved specifications. A compliance standard of the unmanned vehicle is determined. The determination is based on the comparison.

Embodiments of the present disclosure also include a station for compliance testing of unmanned vehicles. The station comprises a dedicated area for acceptance of an unmanned vehicle. The dedicated area is configured for permitting the unmanned vehicle to be in a first inspection position. The station further comprises a transmitter. The transmitter is directed towards the dedicated area. The transmitter is configured to instruct the unmanned vehicle to perform a behavior. The station further comprises a sensor. The sensor is directed towards the dedicated area. The sensor is configured to detect a non-compliance of the unmanned vehicle. The detected non-compliance is in response to the instructed performed behavior of the unmanned vehicle.

Embodiments of the present disclosure also include an unmanned vehicle configured for self-compliance testing. The unmanned vehicle comprises a memory that includes one or more instructions. The unmanned vehicle further comprises a processor communicatively coupled to the memory. The processor is configured to read the one or more instructions from the memory. The processor is further configured to instruct the unmanned vehicle to perform one or more behaviors based upon the instructions. The processor is further configured to operate in a compliant mode and a non-compliant mode. The unmanned vehicle further comprises a second processor. The second processor is configured to monitor the unmanned vehicle. The second processor is further configured to determine the unmanned vehicle is non-compliant. The determination is based on the monitoring of the unmanned vehicle. The second processor is further configured to instruct the processor to operate in the non-compliant mode. The instruction is based on determining the non-compliance.

Embodiments of the present disclosure also include an enforcement unmanned vehicle for compliance testing of subject unmanned vehicles. The enforcement unmanned vehicle comprises a fixed body. The enforcement unmanned vehicle further comprises one or more motors integrally coupled to the fixed body. The one or more motors for providing movement of the enforcement unmanned vehicle. The enforcement unmanned vehicle further comprises a transmitter coupled to the fixed body. The transmitter is configured to instruct a first subject unmanned vehicle to perform a behavior. The enforcement unmanned vehicle further comprises a sensor coupled to the fixed body. The sensor is configured to detect a non-compliance of the subject unmanned vehicle. The non-compliance is detected in response to the instructed performed behavior of the first subject unmanned vehicle.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
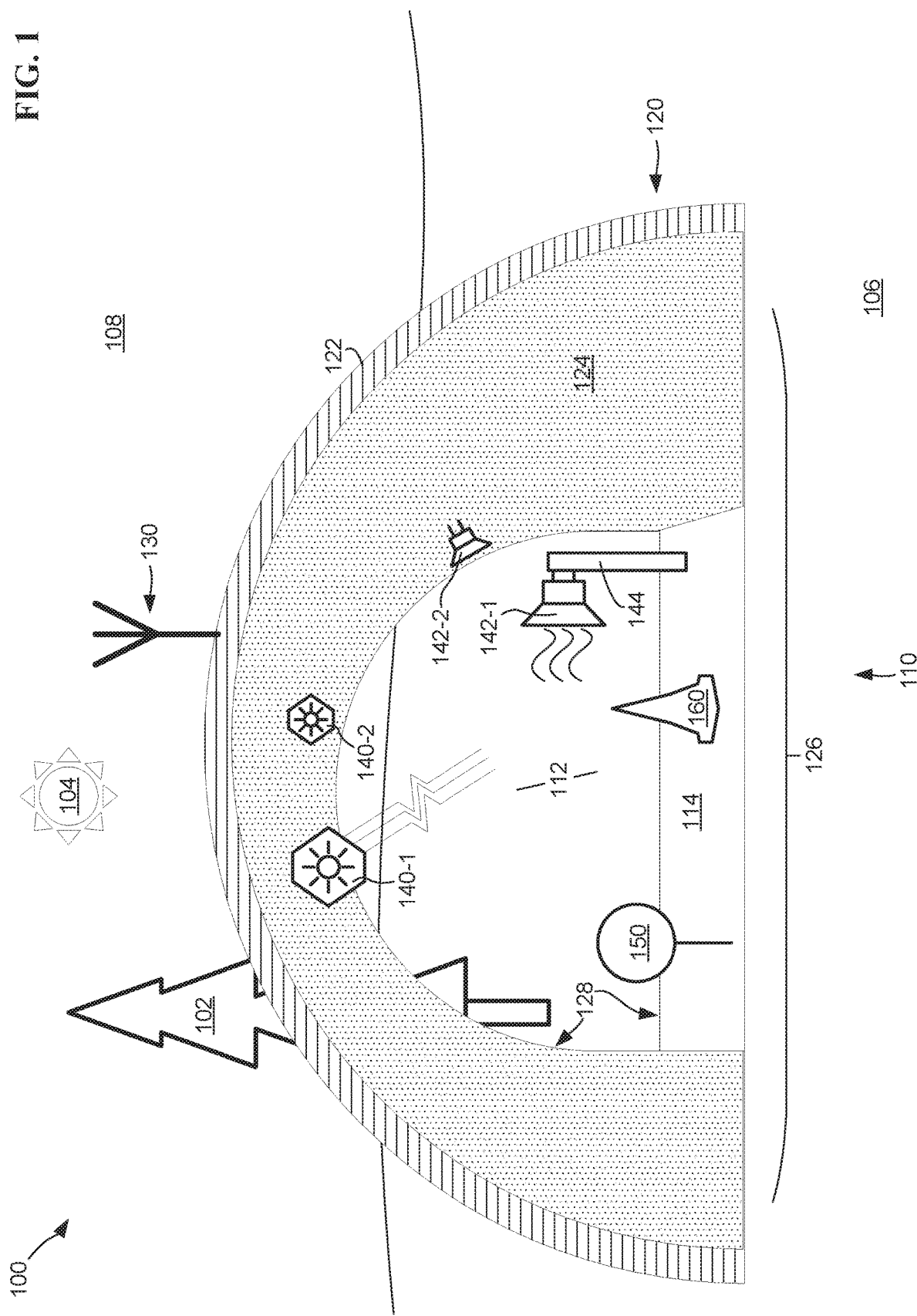
FIG. 1 depicts a drone inspection station for the reception and inspection of drones consistent with embodiments of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to unmanned entities (drones), more particular aspects relate to the inspection, verification, and self-verification of drones for compliance based on observed drone operation. While the present disclosure is not necessarily limited to such applications, various aspects of the disclosure may be appreciated through a discussion of various examples using this context.

In context of the present disclosure, the term drone may refer to an unmanned entity, remote controlled vehicle, robot, or other mechanical remote-control device. Drones may operate on land, through the air, or in water. In some contexts, a drone may be referred to as an unmanned vehicle or an autonomous vehicle. A given drone may include the following: one or more motors for propelling the drone through an environment, a battery for storing energy used by the motors, a transceiver for sending and for receiving instructions remotely from a user and communicating drone information to the user, a processor for processing received instructions and processing information to be communicated, and a body for housing and mounting all the other components. Some drones may include additional components such as sensors for movement, cameras and gimbals, landing gear, wheels or tracks for ground-based drones, rudders for aerial- or water-based drones, etc. For example, aerial drones may include one or more position and location sensors for communicating orientation and position readings to aid the processor of the drone in maintaining flight, and in communicating the readings as information to the user. In a second example, drones may include a camera for obtaining photos and a gimbal for pointing the camera at various subjects. Continuing the second example, the gimbal may further provide for stabilization of the camera of an aerial drone to improve the images obtained by the aerial drone.

Drones are becoming very popular around the world for a variety of uses and markets. Drones are also being operated in more areas such as residential neighborhoods and cities. The increased ubiquity is occurring as not only the drone market but others grow and mature. The dominance of smartphones for example have lowered the price of wireless radios and small battery-efficient processors. For another example, action cameras and again smartphones have lowered the cost of entry for camera technology, which has increased the proliferation of video sensors and camera lenses. For yet another example, battery technology has improved due to yet again smartphones in recent times, which has resulted in more advanced capabilities in drone operating times between recharging and/or battery swapping.

All the technologies that enable drones to become more capable correlate with an increased market desire to have drones. As drones can fly longer with better batteries, drones can be used for longer durations, such as search and rescue. Drones can also fly farther with better wireless communication technologies such as underwater and aerial wildlife observation. As drones can take better pictures with improvements in cameras, drones become useful in filmmaking and in covering sporting events.

As the price of drone components become lower the variety of drones has increased in three distinct ways: variation, pricing, and modifications. The expanding uses and the expanding market have created an increase in not only the number of drones but also in the variation of drones (e.g., the size, shape, and capabilities) from a plurality of manufacturers. Additionally, drone pricing has come down as manufacturing has scaled and availability has increased outside of professional markets into amateur and hobbyists. Consequently, drones are now used for sports and recreation.

With the expanding number of drones, use cases, and increased involvement of hobbyists, modification of drones has consequently expanded. Drone modifications can be numerous and wide ranging, and may involve modifying or replacing any of the componentry of the drone. For example, a processor of the drone may be replaced with an updated or different processor that provides increased functionality or processing. In a second example, the processor may be overclocked to provide increased functionality. In a third example, the camera of a drone may be replaced, either in whole or in part, to capture images of a level of sophistication not originally intended. Continuing the third example, the modified camera may provide night vision capability when the unmodified original camera of the drone was only capable of capturing video in a well-lit daytime environment. In some cases, multiple components of a drone may be modified. In a fourth example, the motor of a drone may be replaced with higher-power units, the battery of the drone may be replaced with a larger capacity batter, and the transceiver of the drone may be modified to operate over a longer range. Continuing the fourth example, the modifications may grant the drone with the ability fly at a higher altitude than the original manufacturer or retailer of the drone anticipated.

Drone compliance and regulation is also becoming an increasing reality. Many local, regional, and national governmental agencies are trying to ensure that drones are operating consistent with new and existing legal requirements. These laws may arise for multiple reasons. As drones proliferate in uses, they may also be used for illegal or bad acts. Additionally, laws may be brought about due to new business models or updates to existing business models (e.g., drone package delivery filling roads and skies with drones). Enforcement and compliance becomes a large technical problem due, at least in part, to these multitude of factors.

One difficulty is being able to consistently provide testing procedures that can identify any non-compliance in a drone. Existing databases that require manual inspection or testing procedures may be difficult to follow and enforce. Manual inspection may include other complications, such as the sophistication and variety of both drones and modifications to drones may make physical inspection difficult or ineffective. For example, the body of a given drone may be a fixed continuous hard material such as carbon fiber or plastic and the motors, batteries, and processors may be housed inside of the fixed body. Continuing the example, as the various components are not visible from the outside, an enforcement agent may need to disassemble the drone to view the size, shape, or serial number of the various components. Further continuing the example, the disassembly of the fixed body may be disadvantageous as it may be unreasonably time consuming or lead to damage to body or interior components.

Another difficulty is being able to provide testing procedures in a variety of environments. Often enforcement agents may, as a practical or legal matter, only be able to stop and require a test that is quick and a small imposition of the drone operator or owner. Additionally, as drones will be used in neighborhoods, factories, city streets, indoors, and outdoors, it is imperative that an enforcement agent need a test that is predictable and repeatable. A drone flying in a parking garage in summer time should be as easily testable as a drone driving in a national park during a rainy spring evening. These various lighting and atmospheric conditions may increase the difficulty of test repeatability. Lastly, the various components of drones may degrade or change over time (e.g., batteries and motors). The changes may make it difficult to test the drones for compliance. For example, a new drone may fly at a first altitude, or turn at a first angular velocity, however a slightly used drone may not due to aging or damaged components.

Embodiments of the disclosure solve describe advanced drone testing (ADT) that solves the variety of technical problems associated with drone inspection and compliance. The ADT may provide improved speed in testing drones by reducing the time it takes to identify, conduct, and determine the compliance of drones. The ADT may operate in multiple environments and may be set-up and taken-down quickly. The ADT may operate based on extrinsic observations of a given drone (e.g., without requiring any invasive and potentially damaging deconstructions). The ADT may also take into consideration the wear and tear, and aging of the drone and its components (e.g., factoring in aging and wear variables).

In some embodiments, advanced drone testing includes observation of the drone externally by monitoring the functions and characteristics of the drone. The ADT may observe characteristics of the movement of a drone while it performs various actions (e.g., turning, stopping, landing, hovering, etc.). The ADT may observe various characteristics by observing extrinsic characteristics of a drone (e.g., the thermal, sound, electromagnetic force (EMF) intensity, Hall effect sensing, wind speed from propellers, etc.). The ADT may observe additional functioning and characteristics of various components of the drone as well (e.g., picture and video output of a drone camera, pulling forces, cargo capacity, response time to commands, etc.).

In some embodiments, advanced drone tests operate on drones without additional software or specialized hardware. For example, preexisting drones manufactured without knowledge or consideration of the advanced drone testing procedures. The ADT may be performed by instructing a drone to perform one or more actions (e.g., fly upwards, hover, drive forward, turn at minimum turning radius, take a picture). The instructed actions may be compared to a specification (e.g., one or more predetermined actions of the drones). The specifications may be provided by a manufacturer or retailer of the drone. In some embodiments, the specifications may be determined based on past performance of drones of the same model. Moreover, a probabilistic model may be based on and generated based on the past performance.

In some embodiments, the advanced drone testing involves drones that include specialized software or hardware. For example, dedicated firmware chips may be incorporated into a given drone and may control or administer the ADT to the drone. The administration of the ADT may be based on one or more instructions provided to the drone extrinsically. The administration of the ADT may be performed by one or more instructions provided to the drone intrinsically from the dedicated hardware and/or software.

In some embodiments, advanced drone testing occurs at a drone inspection station. The drone inspection station may be a dedicated area, device, or combination thereof. The drone inspection station may include sensors and transceivers, for performing the observation of behavior and characteristics, and for instructing the drone to perform the various actions or behaviors, respectively.

In some embodiments, advanced drone testing occurs through the instruction or interaction with an enforcement drone. For example, an enforcement drone may include a plurality of components including the following: a transceiver for instructing and commanding subject drones; one or more sensors for observing subject drone extrinsic characteristics; one or more motors for movements through an environment; and a fixed body configured to house the plurality of components. The one or more sensors of the example enforcement drone may include one or more of the following: an ultraviolet sensor, a Hall effect sensor, a thermal sensor, a visible light camera. for observing subject drones. The fixed body of the example enforcement drone may be made of a carbon fiber, plastic, metal alloy, or composite material.

The example enforcement drone may operate from a power source, such as a lithium ion battery pack mounted inside of the fixed body. The power source may include a cord that the example enforcement drone drags behind its fixed body; the cord may lead to a power source external to the example enforcement drone, such as a stationary or trailer-based hydrogen fuel cell. The example enforcement drone may further include an external tagging system for flagging noncompliant drones. The external tagging system may include spray nozzle mounted to the fixed body and configured to spray a noncompliant drone with a paint or dye stored within a reservoir mounted to or inside the fixed body. The dye may be of a nature only detectable to other enforcement agents, such as a fluorescent dye. The dye may be of a nature detectable by and stand out to humans, such as iridescent paint. The example enforcement drone may further include a disabling system for disabling noncompliant drones. The disabling system may be a net or glue that can be thrown upon the subject drone by the example enforcement drone to impede the movement of the subject drone.

The example enforcement drone may operate by maneuvering (e.g., driving, flying, swimming) into a position relative to the subject drone. The position may be adjacent to the subject drone such that the example enforcement drone may inspect the subject drone with one or more sensors. The position may be within range of a transceiver of the subject drone such that the example enforcement drone may use its transceiver to communicate instructions to the subject drone. The instructions may include requesting the subject drone to take an image. The instructions may include requesting the subject drone to transmit to the transceiver the requested captured image. The instructions may include requesting the subject drone to take a video at certain resolution. The instructions may include requesting the subject drone to transmit to the transceiver the video captured in the previous 10 minutes. The instructions may include requesting the subject drone mimic or follow the enforcement drone.

Determination of the subject drone's compliance may be performed locally on the example enforcement drone or remotely (at a server or datacenter). Upon determining the subject drone is compliant the enforcement drone may end initiation of contact. Upon determining the drone is not compliant or non-compliant, the enforcement drone may perform one or more corrective or enforcement actions. A first enforcement action may be transmitting a command to the subject drone to return to a law enforcement station for further inspection. A second enforcement action may be spraying the subject drone with ultraviolet paint to mark the noncompliant drone or noncompliance of a component of the drone. A combination of enforcement actions may be taken, such as instructing the subject drone to operate with diminished capacity and return to a local third party for dismantling.

FIG. 1 depicts a drone inspection station 110 for the reception and inspection of drones utilizing advanced drone testing consistent with embodiments of the disclosure. The drone inspection station 110 may be set up in a real-world environment 100. The real-world environment 100 may include any of the following: flora 102 from a plurality of trees, rocks, and other terrain, a light-source 104 including man made lights or the sun, a continuous surface 106 such as the earth or a man-made platform, and an airspace 108 where operation and passing of drones may occur. For example, the real-world environment 100 may be a neighborhood green-space park open for both residential and commercial use. Continuing the example, both wheeled and aerial commercial shipping drones, and aerial recreational racing drones may occupy and move both about the ground 106 and through the air 108.

The drone inspection station 110 of FIG. 1 includes the following: a dedicated area 112 for acceptance of drones; a horizontal surface 114 adjacent to the dedicated area; a partially enclosed structure 120; a transceiver 130 for broadcasting instructions and receiving information from drones; a first series of sensors 140-1 and 140-2 (collectively 140); a second series of sensors 142-1 and 142-2 (collectively 142); a sign 150 for communicating information; and an obstacle 160.

In some embodiments, the drone inspection station 110 may include more less components than depicted in the example environment 100. For example, a drone inspection station may include only a dedicated area for acceptance of drones without the horizontal surface, such as a mid-air inspection station or an inspection station fastened to the side of a building or a tree. In a second example, a drone inspection station may only include the following: a dedicated area for acceptance of drones; a first transmitter placed to the side of the dedicated area; and a first sensor placed below the dedicated area. In a third example, a drone inspection station may only include a dedicated area for acceptance of drones and a sensor for monitoring operations and behaviors of drones. Continuing the third example, the drone inspection station may utilize the sensors to passively and continuously monitor drones that pass into the dedicated inspection area. In a fourth example, the drone inspection station 110 is located on a vehicle such as the cargo truck bed or airplane. The testing station could be in a rectangular container, the same size as the cargo container, on the cargo bed of the vehicle. The vehicle can be used for inspection when it's parked or moving. The vehicle can be un-manned or control by a person. The vehicle can be summoned to a destination for inspection.

The dedicated area 112 of the drone inspection station 110 is a continuous three-dimensional space sized and shaped to accept the movement of various land, air, and sea drones into one or more positions for inspection (inspection position). The inspection position may be a fixed position (e.g., stopped, landed, hovering). The inspection position may be moving throughout three-dimensional space into one or more positions of the dedicated area 112. In some embodiments, a dedicated area 112 may include any shape, such as a column or a pyramid. The dedicated inspection area 112 may vary in size to accept a variety of drones for testing depending on various use-cases. In a first example, a contemplated drone size may be equivalent to that of a passenger vehicle, and the dedicated inspection area 112 may be on the scale of feet (e.g., 10 feet high, by 30 feet long, by 15 feet wide). In a second example, a contemplated drone size may be equivalent to that of a large insect, and the dedicated inspection area 112 may be on the scale of inches (e.g., 15 inches long, by 7 inches in diameter).

In some embodiments, multiple dedicated areas 112 may be contemplated. In a first example, a first dedicated inspection area may be placed at the entrance of a park where a transceiver for instructing the drone may operate to instruct the drone to fly through a real-world environment around a tree to a second dedicated area where sensors may monitor the flight and turning of the drone as well as the drone's EMF radiation. Continuing the first example, the drone may be prevented from operating (e.g., blocking control signals sent to the drone from the operator) until passing the advanced drone testing. In some embodiments, a dedicated area may be contemplated that is only defined by two dimensions (e.g., a length and a width) providing an area for the acceptance of ground-based drones for inspection. In some embodiments, a dedicated area for inspection of drones may be of two defined dimensions (e.g., height and width) but may extend an indeterminate amount (e.g., of length) providing a portion of a highway or river for the acceptance of drones for inspection. The dedicated area 112 may provide enhanced safety, such as by preventing modified drones from operating together with unmodified drones. The dedicated area 112 may provide enhanced privacy, such as preventing certain cameras from operating in and around specific areas.

The horizontal surface 114 of the drone inspection station 110 is a solid material, such as steel or aluminum that provides one boundary of the dedicated area 112. The horizontal surface 114 may be of a weight and rigidity for mounting of the partially enclosed structure 120 and one or more of the sensors 140 and 142, and sign 150. The horizontal surface 114 may include other componentry for measuring or observing characteristics of the drone. For example, the horizontal surface 114 may include a scale for measuring the weight of the drone as it drives or lands on the horizontal surface. In some embodiments, the horizontal surface 114 may be formed from the ground 106 of the environment 100. An aluminum pole 144 juts upwards out of the horizontal surface 114. The aluminum pole 144 may be a protrusion that juts away from the horizontal surface 114. In some embodiments, the other protrusion may be contemplated (e.g., a horizontal wooden protrusion, a composite protrusion, a plurality of protrusions, etc.) The aluminum pole 144, is rigid and shaped to accept sensor 142-1 and raise it a first distance from the horizontal surface 114. In some embodiments, multiple elements of the drone inspection station 110 may be mounted or fixed to the aluminum pole 144 (e.g., transceivers, sensors, signs, etc.).

The partially enclosed structure 120 of the drone inspection station 110 is a solid continuous structure demarcating the boundary of the dedicated area 112. The partially enclosed structure 120 includes an outside surface 122 and an inside surface 124. The partially enclosed structure 120 also includes a first opening 126 and a second opening 128 providing a tunnel shape. The partially enclosed structure 120 may be constructed from a rigid material such as composite plastic or aluminum. The partially enclosed structure 120 may be made of a flexible material such as canvas, which provides for a collapsible and more portable drone inspection station 110. The partially enclosed structure 120 is configured to house and support the weight of the sensors 140 and 142. The partially enclosed structure 120 may also provide for protection of the sun 104 and other elements of the environment 100 (e.g., rain, snow, etc.). In some embodiments, a partially enclosed structure may include only a singular opening (e.g., on a first side of the partially enclosed structure, on a top of the partially enclosed structure, etc.). In some embodiments, a partially enclosed structure may take the form of a wall or a roof supported by poles or other supports. The partially enclosed structure 120 may be constructed of a material designed to block external radiation from the environment 100 (such as light and/or heat from the sun 104), or from an owner of the drone (such as communication signals from a controller of the drone).

In some embodiments, the partially enclosed structure 120 may include two doors (not depicted), which contain drones for advanced drone testing. The two doors may be moveably connected to outside surface 122, the inside surface 124, or one to the outside surface and another to the inside surface. The two doors may operate into an open position and a closed position to block the first opening 126 and the second opening 128, respectively. The two doors may be constructed of a material designed to block external radiation from the environment 100, or from an owner of the drone. Each door of the two doors may operate the same or separately. In a first example, a first door of the two doors is a metallic door that pivots on a hinge (not depicted), the hinge mounted to the outside surface 122 at the first opening 126. In a second example, a second door of the two doors is a net or webbing made of composite material that unrolls from the top of the inside surface 124 of the second opening 128. In the open position, the two doors provide the drone for ingress to and egress from the dedicated area 112. In the closed position, the two doors prevent exit from or entrance to the dedicated area 112 by the drone. The two doors may be powered by hydraulic pistons, electric motors, or the like. The two doors may be triggered to operate into the closed position in response to the drone entering the dedicated area 112 and to operate into the open position in response to the drone passing ADT. The two doors may be triggered to operate into the open position in response to the drone nearing the dedicated area 112 and to operate into the closed position in response to the drone failing ADT.

The transceiver 130 is positioned on the outside surface 122 of the partially enclosed structure 120. In some embodiments, the transceiver 130 may be positioned in various other locations both near and separate from the dedicated area 112 for acceptance of the drone for testing. For example, the transceiver 130 may be positioned on the horizontal surface 114, near the second opening 128, or adjacent to the dedicated area 112. The transceiver 130 may be communicatively coupled to the sensors 140 and 142 to provide information to the sensors. In some embodiments, the transceiver 130 may be communicatively coupled to additional elements, such as a tester of the drone or a remote data center, to report test results from the sensors 140 and 142. The transceiver 130 operates to instruct the drone. For example, the transceiver 130 may instruct the drone to enter the dedicated area 112, to perform behaviors, to disable operation, etc. The transceiver 130 may be in the form of a transmitter, and may only provide for the sending of instructions to the drone. For example, instructing the drone to fly through the dedicated area 112 at a 4 mph, instructing the drone to fly though the dedicated area as fast as possible without hitting anything, instructing the drone to hover in the dedicated area, instructing the drone to stop on the horizontal surface 114, etc. In some embodiments, the transceiver 130 may operate to send and receive information (e.g., video signals captured by a camera of the drone).

Sensors 140 and 142 are positioned inside of the dedicated area 112 for acceptance of the drone. The sensors 140 and 142 are positioned such that they are oriented or directed towards the dedicated area 112. Sensors 140 and 142-2 are permanently affixed to the inside surface 124 of the of the partially enclosed structure 120. Sensor 142-1 may be temporarily or permanently fastened to the pole 144 with a clamp. In some embodiments, the sensors 140 and 142 may be temporarily affixed to the inside surface 124. For example, the sensors 140 and 142 may further include one of a hook-and-loop fastener and the inside surface 124 of the partially enclosed structure 120 may include the other of the hook-and-loop fastener to provide temporary attachment and mounting of the sensors. The sensors 140 and 142 are configured to sense the behavior and extrinsic characteristics of the drone as it performs tests and instructed behaviors. The sensors 140 and 142 may operate in a serial manner. As depicted in FIG. 1, sensor 140-1 and 142-1 are currently operating while sensor 140-2 and 142-2 are not presently operating.

Sensors 140-1 and 140-2 are of a first type of sensor and sensors 142-1 and 142-2 are of a second type. For example, sensors 140 are cameras configured to capture images and video of drones in the visible light spectrum, and sensors 142 are EMF sensors configured to capture various electrical radiation from the drone and its components (e.g., motors, transmitters, camers, controllers, etc.). Sensors 142 operate to capture EMF measurements (such as intensity) of components emitted by the drone despite the components being partially or totally invisible to an enforcement agent. In a first example, a motor of the drone being subject to advanced drone testing may be partially covered by a fixed body of the drone. In a second example, a controller of the drone being subject to the ADT may be completely covered.

It is contemplated that a variety of sensors may operate using the drone inspection station 110. Other contemplated sensors may include any of the following: thermal sensors to detect heat of a portion of the drones fixed body due to the operation of internal components; Hall effect sensors to detect the current flowing through wires or traces of one or more printed circuit boards located inside the fixed drone body; sound sensors to detect the decibels of any motors or propellers attached to the drone; wind-speed sensors to detect the velocity of wind coming from propellers of the drone; etc. The sensors 140 and 142 may be communicatively coupled to the transceiver 130 to relay the results of the ADT (e.g., compliance or non-compliance of tested drones). In some embodiments, the sensors 140 and 142 may be communicatively coupled to other components of the drone inspection station 110. For example, if a drone is determined to be non-compliant because the EMF intensity is too high, the sensors 140 and 142 may communicate this noncompliance to an enforcement agent.

The sign 150 communicates information related to the advanced drone testing of the drone inspection station 110. The sign 150 is coupled to the horizontal surface 114. The sign 150 may communicate a fixed piece of information (e.g., painted or embossed). The sign 150 may communicate multiple pieces of information. For example, a light emitting diode may function to light up and go unlighted to communicate information, a liquid crystal display (LCD) for displaying of information, etc. The sign 150 may communicate information to the enforcement agent, such as readings from the sensors 140 and 142. The sign 150 may communicate information to the drone, such as providing instructions or tests to the drone. In some embodiments, the sign 150 may render instructions and/or information in a variety of ways, such as text, images, or even quick response (QR) codes that are readable by cameras of drones for translation by the drones into instructed behaviors of ADT. The obstacle 160 of the drone inspection station 110 may be present for testing of drones' movement capabilities, such as how close or how quickly a given drone may navigate around the area. The obstacle 160 may be present for testing of drones' image capture capabilities. The obstacle 160 may take the shape of a cone or pylon and may be moveable. In some embodiments, the obstacle 160 may be integrally coupled to the horizontal surface 114.

The drone inspection station 110 may implement ADT to quickly and consistently allow a city police officer to verify and enforce any city or county laws requiring the type of drones and modifications to them. The drone inspection station 110 may be used to model the characteristics of a new drone (e.g., at a manufacturing facility where the drone is initially assembled) to model the one or more drone specifications. The drone inspection station 110 may be used to model the characteristic of a used drone (e.g., a small neighborhood repair shop) to modify or append the one or more drone specifications. The drone inspection station 110 may be setup quickly in a myriad of real-world environments (e.g., a residential home, a remote forest, etc.) for compliance testing against one or more drone specifications.

The drone inspection station 110 may be used to test drones for both compliance to one or more laws and regulations, as part of periodic maintenance, and to determine if the drone is damaged or defective.

Figure 2:
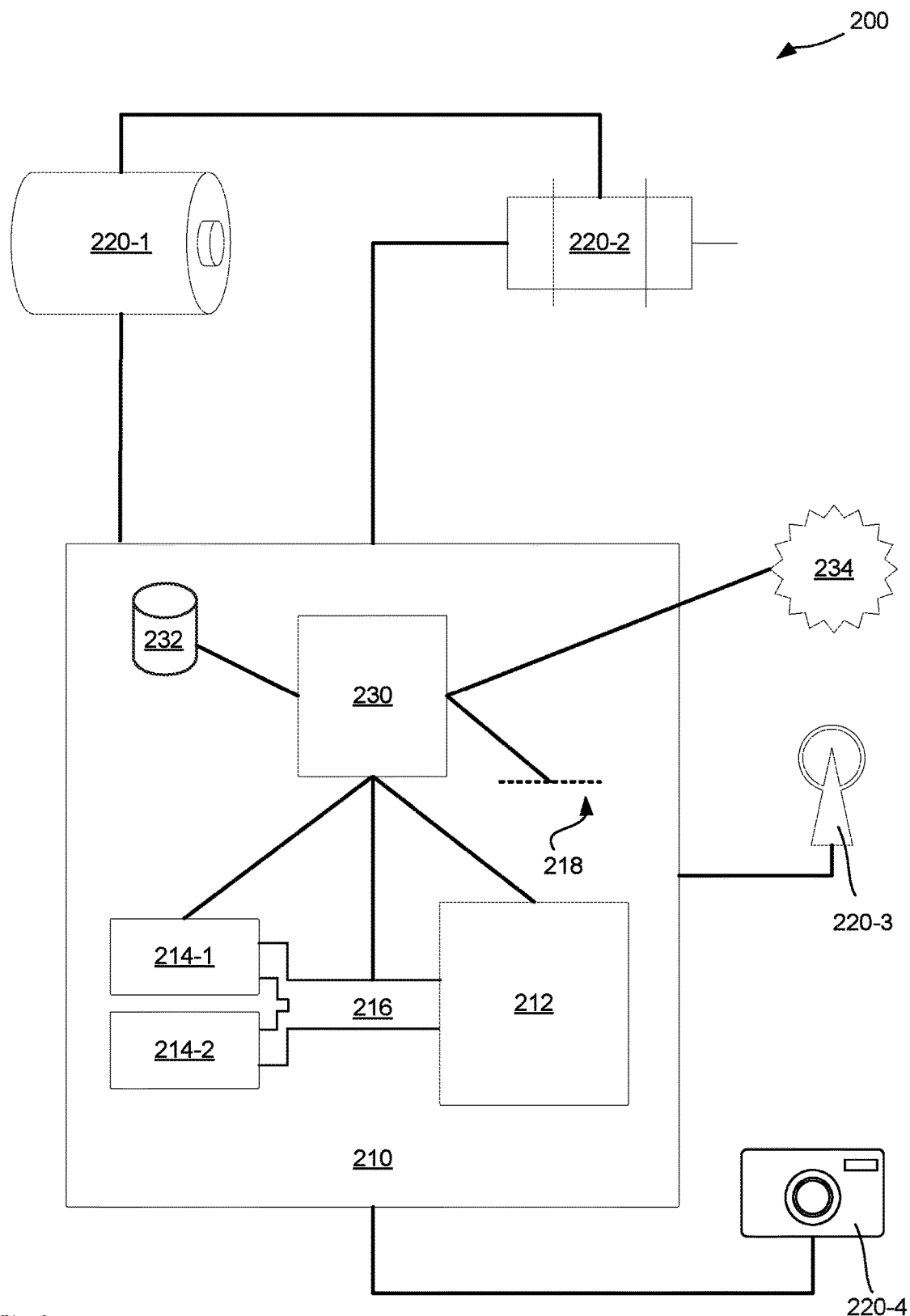
FIG. 2 depicts components a drone for self-compliance testing consistent with embodiments of the disclosure.

FIG. 2 depicts components a self-checking drone 200 (alternatively, drone) for self-compliance testing consistent with embodiments of the disclosure. The self-checking drone 200 includes the following: a system board 210; a plurality of drone components 220 communicatively coupled to the system board; and a self-checker 230 for monitoring the compliance of the drone. The self-checking drone 200 may include a combination of hardware, software, or both hardware and software. The self-checking drone 200 performs advanced drone testing to determine the compliance of the drone with various regulations. In some embodiments, the self-checking drone 200 may perform additional testing and diagnostics to determine whether the drone has been damaged. In some embodiments, the self-checking drone 200 may include more or fewer components than depicted in FIG. 2. For example, self-checking drone 200 may include a claw or mechanical arm for grasping and manipulating real-world objects, such as rocks and packages. The self-checking drone 200 may increase processing efficiency as including a separate dedicated processor for determining any non-compliance would unburden a main processor from spending additional cycles on such determinations. The reduced overhead may allow for drones to fly with more precision and while utilizing less memory.

The system board 210 of the self-checking drone 200 operates to control the operation of the drone. For example, the system board 210 receives information from an operator of the drone and carries out movement. The system board 210 includes a plurality of on-board components including the following: a processor 212 for performing processing of instructions and issuing commands; memory components 214-1 and 214-2 (collectively 214) for storage and retrieval of data, commands, and other data; a bus 216 for communicatively coupling together the processor and memory components; and one or more system connections 218 that connect the on-board components to the plurality of drone components 220. In some embodiments, one or more on-board components may be combined. For example, the structure and function of the processor 212 and function of the memory 214 and the bus 216 may be embodied into a single entity (e.g., chip, integrated circuit, central processing unit, etc.).

The structure of the processor 212 may be a field programmable gate array, integrated circuit, microcontroller, or the like. The processor 212 may operate by retrieving instructions stored in the memory components 214. The processor 212 may operate by storing data (e.g., instructions from a drone operator, or information from the plurality of drone components 220) in the memory components 214. The memory components 214 may be heterogenous in nature. For example, memory component 214-1 may be a random-access memory that is volatile in nature, providing for temporary storage. Continuing the example, memory component 214-2 may be a solid-state flash memory that is non-volatile in nature, providing for permanent storage. In some embodiments, the memory components 214 may be homogenous in nature. For example, both memory components 214-1 and 214-2 may utilize non-volatile memory, providing for both short-term and long-term storage.

The plurality of drone components 220 includes the following: a power source 220-1, at least one motor 220-2, a transceiver 220-3, and a camera 220-4. The plurality of drone components 220 are mounted to or inside of the self-checking drone 200. The plurality of drone components 220 communicate with the system board 210 via the one or more system connections 218 (e.g., the one or more system connections are a plurality of electrical pathways for sending and receiving data). The power source 220-1 may provide power directly to the self-checking drone 200. For example, the power source 220-1 may be a battery, such as a lithium ion battery that provides electrical power. The power source 220-1 may provide power indirectly to system board 210. For example, the power source 220-1 may be a combustion engine and electric generator (not depicted) for producing power and providing power.

The power source 220-1 is communicatively coupled to the various on-board components by way of the one or more system connections 218 of the system board 210. The power source 220-1 is directly connected to the at least one motor 220-2 of the self-checking drone 200. The power source 220-1 is indirectly connected to the transceiver 220-3 and the camera 220-4, by way of the system board 210. The at least one motor 220-2 is configured to move or manipulate the drone. The at least one motor 220-2 may be connected to additional components, such as wheels, pulleys, propellers, etc. The transceiver 220-3 is configured to send and receive data to and from the drone (e.g., to an enforcement agent, to a drone operator, to another done). The transceiver 220-3 may send and receive instructions, such as where to fly or when to stop driving. The transceiver 220-3 may send and receive other data, such as images. The camera 220-4 is mounted to the outside of the self-checking drone 200 and is configured to capture images and/or video. The camera 220-4 may include other components such as a gimble for camera orientation and stabilization.

The self-checker 230 is configured to monitor to determine the compliance of the self-checking drone 200. The self-checker 230 may be in the form of a processor, a microcontroller, an integrated circuit, or the like. The self-checker 230 also includes local memory (not depicted), such as one or more caches for storing of various advanced drone tests and results of ADT. The self-checker 230 is directly connected to some components (e.g., the processor) and indirectly connected to other components (e.g., the camera through the system connections 218). The self-checker 230 may include other elements (not depicted) such as yaw-rate sensors, global positioning sensors, height sensors, internal thermal sensors, and the like. The other elements may be utilized to assist the self-checker 230 in performing ADT. The validity and identity of the self-checker might be verified cryptographically. For example, the self-checker might contain a private key and cryptographic algorithm. The identity can be validated by providing an input string to the self-checker, and the self-checker will encrypt the string using the private signing key and return to the requester. The requester will verify the signature by decrypting the encrypted string using the public key. This private key and public key pair is generated during manufacturing of the done, and aftermarket modification to the self-checker will not be able to provide the same signature.

The self-checker 230 of the drone is communicatively coupled to a data store 232 and an external emitter 234. In some embodiments, the self-checker 230 is exclusively connected to the data store 232 and the external emitter 234 such that no other components of the self-checking drone 200 can communicate with the data store 232 and the emitter 234 (e.g., not communicatively coupled to the self-checking drone 200 other than the self-checker 230). In some embodiments, the self-checker 230 and the data store 232 are combined into a single element.

The data store 232 provides for the storage and retrieval of information related to advanced drone testing. The data store 232 is at the control of the self-checker 230. The data store 232 may be of a read-only configuration (e.g., a firmware, a ROM, etc.). The self-checker 230 retrieves instructions for its operation from the data store 232. The self-checker 230 may also retrieve other information from the data store 232, authorization codes (e.g., hashes, unique numbers, checksums, etc.) for authenticating any instructions received from the transceiver 220-3, the processor 212, or any other components. The data store 232 may receive power from the power source 220-1 indirectly (e.g., through the self-checker 230). The data store may store many parameters of the self-checking drone 200 for performance of ADT (e.g., maximum velocity of the drone).

The self-checker 230 may determine if the instructions from the data store 232 are valid. In a first example, a private key stored in a non-writeable portion of the self-checker 230 contains a private key in a secure element, and a public key provided by the data store 232 may be compared by the self-checker. The self-checker 230 may determine utilizing the data store 232 if other received or retrieved information is valid. In a second example, a private key stored in a portion of the data store 232 may be retrieved and compared to an instruction paired with a public key received from the transceiver 220-3 for validation of the instruction. In a third example, a version of software or firmware may be executing by the processor 212 and the self-checker 230 may compare the version number or checksum of the software or firmware to a version number stored in the data store 232. In a fourth example, a voltage of current (measured by a Hall effect sensor) between the power source 220-1 and the motor 220-2 may be compared to a compliant range of voltages stored in the data store 232. In a fifth example, anomaly detection can be used to determine if the drone is performing abnormally compare to a model of expected behavior generated at manufacturing time. This model might contain, for example, a mapping of flying speed to noise, energy consumption, temperature, communication signature.

The external emitter 234 is configured to externally indicate the compliance of the self-checking drone 200. The external emitter 234 is directed by the self-checker 230 to indicate the compliance of the drone 200. Emitter 234 may be a light emitting diode (LED) in the human-visible spectrum of light. In a first example, the drone 200 is operating in a compliant mode and the LED is illuminated green. Continuing the first example, the drone 200 determined to be non-compliant because the processor 212 is operating at a higher frequency than stated by the specifications in the data store 232. Continuing the first example, based on instruction from the self-checker 230, the LED changes illumination to red. The emitter 234 may be an infrared light and in a compliant mode the emitter may not be active and in a non-compliant mode the emitter may be active to shine emit light. The emitter 234 may be a speaker designed to emit an alert sound or a pre-recorded speech in response to a determined non-compliant mode.

In some embodiments, the self-checker 230 may externally indicate the compliance of the drone without the user of external emitter 234. In a first example, the self-checker 230 may determine that the drone is operating non-compliantly, because the drone is turning faster than the drone was manufactured to turn. Continuing the first example, the self-checker 230 may intercept or alter the instructions of the processor 212 that are communicated to the at least one motor 220-2 causing the drone 200 to fly at a low altitude and at a reduced speed.

In a second example, the self-checker 230 may determine that the camera 220-4 has been altered to take pictures of a resolution and/or framerate beyond the initially intended manufacture of the drone. Continuing the second example, when originally manufactured and configured the camera 220-4 is capable of recording sixty frames per second video, but the drone 200 is configured by instructions stored in memory 214-1 to temper performance of the camera to only thirty frames per second. Further continuing the second example, the self-checker 230 upon the determination of operation in the non-compliant mode, the self-checker may instruct the processor 212 to operate at an increased frequency continuously. Yet further continuing the second example, the increased frequency may increase the thermal temperature of the processor 212 and, consequently, the body of the self-checking drone 200 such that the thermal radiation of the drone changes. This can be further detected by external sensor in an inspection station.

Figure 3:
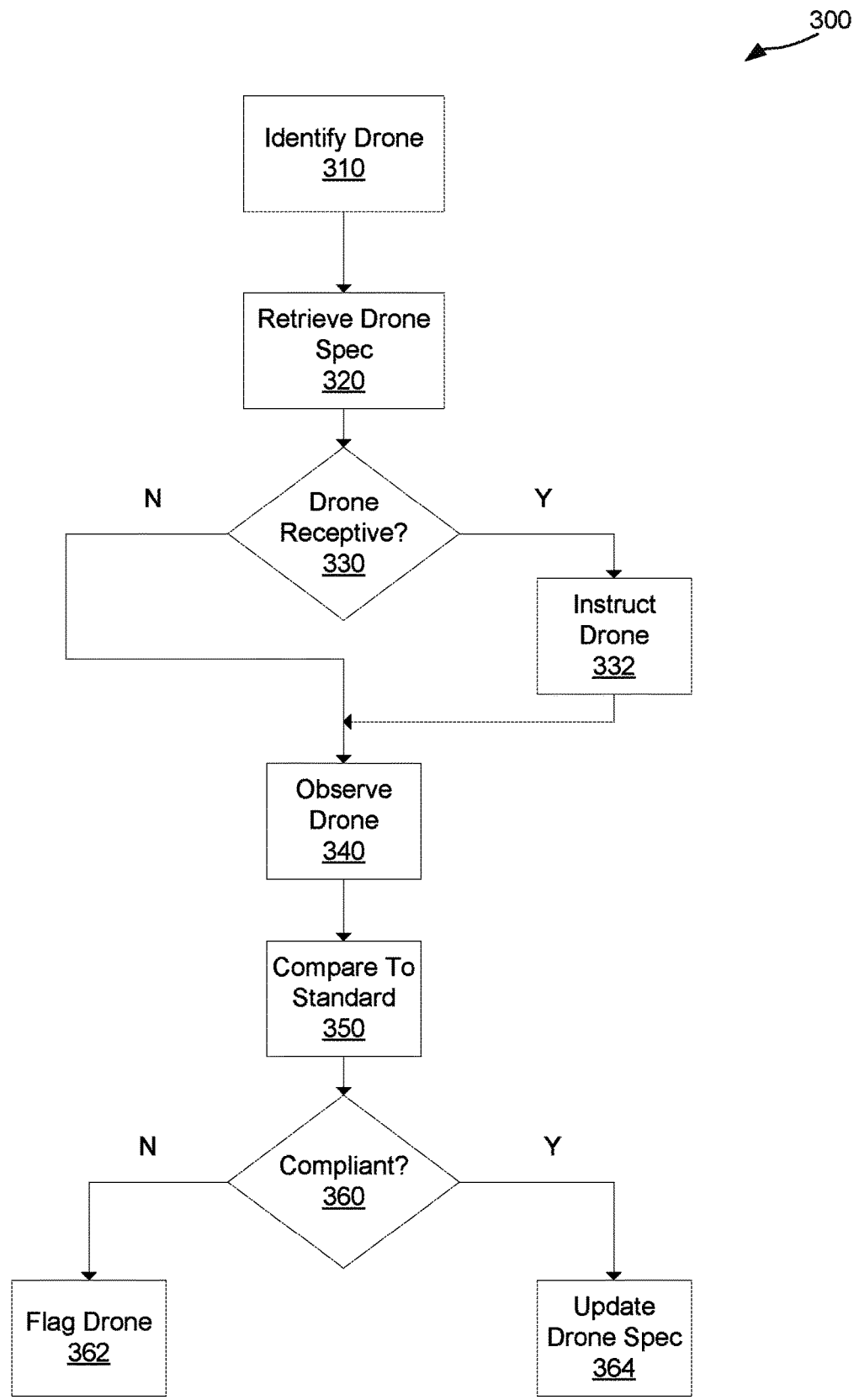
FIG. 3 depicts a method of determining the compliance of drones consistent with embodiments of the disclosure.
Figure 5:
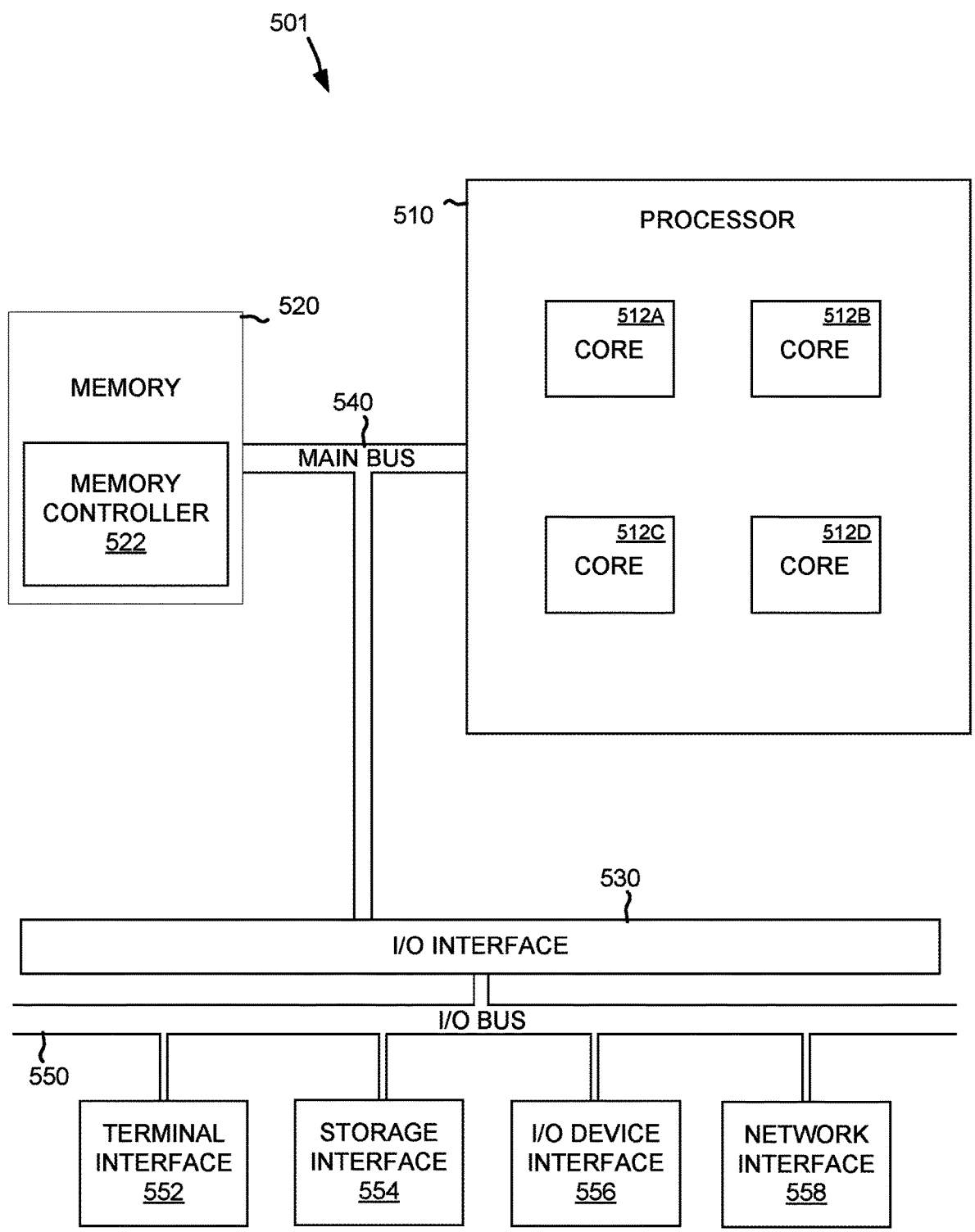
FIG. 5 depicts the representative major components of an example computer system 501 that may be used, in accordance with embodiments of the present disclosure.

FIG. 3 depicts a method 300 of determining the compliance of drones consistent with embodiments of the disclosure. Method 300 may be performed by a computer client, such as a smartphone, server, laptop, etc. For example, an example computer 501 is depicted in FIG. 5 that may operate as a computer client. Method 300 may be performed by a drone inspection station. For example, one or more components of drone inspection station 110 may operate to perform method 300. Method 300 may be performed by a singular enforcement drone. In some embodiments, method 300 may be performed by a plurality of elements. For example, a swarm of two or more enforcement drones may coordinate operation to perform advanced drone tests consistent with embodiments. Continuing the example, some operations of method 300 may be performed by a first enforcement drone of the two or more enforcement drones and other operations may of method 300 may be performed by a second of the two or more enforcement drones. Method 300 may be performed by a self-checking drone. For example, the self-checking drone 200 depicted in FIG. 2 may perform method 300.

Method 300 begins, at 310, when a subject drone (drone) is identified for testing. The drone may be identified, at 310, by visual inspection from a sensor. The sensor may be a visible light sensor, such as a camera. Identification of the drone, at 310, may include comparing a picture taken of the drone to one or more visual images of drones, such as by visually identifying the housing, motors, wheels, or other characteristics of the drone. The sensor may be an ultraviolet, thermal, or other non-visible light sensor. The drone may be identified, at 310, upon the drone performing an operation (e.g., hovering, flying, drawing current from a battery, etc.). The drone may be identified, at 310, by landing on a weight sensing pad or other surface. The drone may be identified, at 310, by audible sound or electrical radiation, such as EMF. The drone may be identified, at 310, internally (e.g., based on a firmware version and comparison to a list of known software versions, based on a serial number stored in a memory and compared to a list of serial numbers, etc.).

After being identified, at 310, the specification of the identified drone may be retrieved at 320. The specification may be retrieved, at 320, from a source external to the subject drone (e.g., external servers in a datacenter, a client device located at a drone inspection station, a smartphone operating a drone compliance smartphone app, etc.). The retrieval, at 320, may be from an internal source of the drone (e.g., a series of drone specifications stored in memory of the drone. The retrieved specifications may form a signature or compliance standard of the drone. The signature may be based upon a single retrieved specification or a plurality of retrieved specifications.

The retrieved specifications may include characteristics of the drone (e.g., weight, EMF intensities of motors, electrical consumption of cameras, thermal parameters of processors, diameter of propellers, software versions of operating systems of the drone, etc.). The retrieved specifications may include behaviors and/or capabilities of the drone (e.g., top speed, maximum angular velocity, landing sequences, camera performance, lifting or cargo capacities, fording depth, etc.). The retrieved specifications may include a communication system of the drone (e.g., a communication frequency, a protocol for data exchange, a method of encoding instructions, an authentication credential for authorizing communication, etc.). The retrieved specifications may include deterioration factors, such as battery health or motor lifespan. In a first example, the specifications may state the number of charge cycles of a battery of the drone before the drone can only operate at reduced performance. In a second example, the specifications may state the number of operating hours that a motor should provide before operating with diminished performance.

Depending on the manufacturing practice and process, the specification and characteristics may be unique for an individual drone or the same for drones of the same model. The specification and characteristics of the drone may be determined at manufacturing time. The specification and characteristics of a drone may be determined after manufactured and before selling, and measured at a third-party or government inspection location. The determined specification and characteristics can be stored and, later (e.g., minutes, weeks, years, etc.), retrieved at 320.

The drone may be receptive to communication, such as wireless communications through Bluetooth, Wi-Fi, dedicated wireless channels, and the like. The drone may be receptive to communication visually, such as by utilizing lights, text, or QR codes. The retrieved specifications may indicate that the drone is receptive to communication. The retrieved specifications may also include authentication information (e.g., a public key, a radio frequency, a control command, a dedicated channel, etc.) for facilitating communication. It may be determined that the drone is receptive to communications in an ad-hoc fashion. In a first example, by communicating on known drone control or communication channels provided by local law enforcement, a drone may respond and indicate it is receptive to instructions. In a second example, by sending out known request signals for retrieval of information, a drone may report its position. In a third example, by broadcasting a source of network connectivity, a drone may be streaming live video from its camera to the network.

If the drone is receptive to communications, at 330, the drone is provided with one or more instructions at 332. Instructing the drone, at 332, may be initiated remotely from a data center. The instructions may be provided, at 332, through a primary communications channel of the drone (e.g., utilizing a radio frequency (RF) signal). The instructions may be provided, at 332, through a secondary channel (e.g., through a dedicated system channel). The instructions may be provided, at 332, directly (e.g., through a universal serial bus (USB) cable to a USB port located on the exterior surface of the body of the drone, through a service pathway located between a security chip to the processor of the drone). The provided instructions may include a request to operate directly (e.g., fly in a circle, take off, drive three feet forward, etc.). The provided instructions may include a request to operate indirectly (e.g., initiate self-test, drive through an obstacle course, etc.). The provided instructions may be in the form of a request (e.g., take a picture of a subject, move an item from a table onto the floor, etc.).

After providing instructions, at 332, (or after retrieval of the drone specifications at 320), the drone is observed at 340. Observation of the drone, at 340, may include observation of a characteristic of the drone (e.g., the heat signature of the drone as it swims along a path, the heat signature of the drone as it hovers in a fixed position, etc.). Observation of the characteristic may be performed by specialized hardware (e.g., EMF sensors at an inspection station, a thermal camera mounted to a vertical pole and directed towards a testing area, a plurality of vibration sensors built into a horizontal surface of roadway the drone tests upon, etc.). Observation of the drone, at 340, may include observation of software of the drone (e.g., recording software versions, memory access requests, processing cycles, etc.). Observation of the drone, at 340, may include observation of behavior of the drone (e.g., the average speed of the drone upon receiving and a command for and in response to performing a movement from a first position to a second position). Observation of the drone, at 340, may include observation of the responsiveness of the drone (e.g., how quickly the drone responds to a command, how quickly the drone initiates a turning maneuver, how quickly the drone changes from a heading in a first direction into moving into a second direction, etc.). Observation of the drone, at 340, may include observation of external appearance of the drone.

In some embodiments, observation of the drone, at 340 may include a plurality of observations (e.g., heat sensing, motion tracking, etc.). Observation of the drone, at 340, may include observing a series of operations. For example, a drone may be instructed, at 332, to perform a parallel parking maneuver between two cars, and subsequently the drone may be requested to drive around the block. Continuing the example, the drone may be observed, at 340, performing the parallel parking behavior and the driving around the block behavior. Further continuing the example, the drone may be instructed, again at 332, to repeat the parallel parking maneuver, and again may be observed, at 340, performing the parallel parking behavior. In some embodiments, observation of the drone, at 340, may include presenting the drone with a real-world element to interact with. In a first example, a drone may be presented with a subject (e.g., a flower) for capture by the drone, and observation at 340, may be requesting the picture captured by the drone for inspection. In a second example, a box may be suddenly placing an obstacle in front of a moving drone, and observation at 340, may be determining how quickly the drone reacts to attempt avoidance of the obstacle.

After observing the characteristics of the drone, at 340, the observations are compared to a standard, at 350, to determine the compliance of the drone. The standard may include one or more parameters that determine the compliance standard of the drone. The compliance standard of the drone may be developed and supplied based on the mass manufacture of drones. The parameters of the compliance standard may be included in the one or more specifications, retrieved at 320. The compliance standard may include a single parameter (e.g., propeller wind speed='47 miles per hour', Hall effect readings within 4 inches of the drive motor='8 millivolts', etc.). The compliance standard may include a range (e.g., thermal heat signature: '47 degrees Fahrenheit'<'107 degrees Fahrenheit', noise level of a camera gimbal actuator, etc.).

The comparison, at 350, may be based upon a deviation in behavior between multiple operations and the relationship between the multiple operations. For example, instructing a drone to fly upwards to a height of three feet then return to two feet a first time, then instructing the drone to again fly upwards to three feet then return to two feet a second time. Continuing the example, the comparison would be how many inches the drone deviates from the first time the drone flew to three feet and the second time the drone flew to three feet measured as two inches. Further continuing the example, the retrieved specifications may indicate that the compliance standard is a deviation in repeated flight of only a single inch.

The comparison, at 350, maybe be based on continuous operation. For example, a drone is instructed to record a video and zoom from 1× to 20× evenly across 5 minutes. The parameters such as heat, Hall effect, power consumption, and captured video over is compared, at 350, to the compliance standard.

If the drone is determined not to be compliant, at 360, then the drone may be flagged at 362. Flagging the drone, at 362, may include instructing the drone to operate differently (e.g., slower, for a small amount of time before shutting off, reducing the resolution of image captures that may be recorded from a camera of the drone, etc.). Flagging the drone, at 362, may include impeding the movement of the drone (e.g., enclosing the drone in an enclosed area, blocking communications from an operator of the drone with a signal jammer, etc.). If the drone is determined not to be compliant, at 360, the drone may be flagged at 362 as modified (e.g., a drone altered from the state it was when original manufactured) and recorded in a government database. If the drone is determined not to be compliant, at 360, the drone may be flagged at 362 as deteriorated (e.g., one or more components exceeding the projected life) and such compliance status may be communicated to a local repair shop.

If the drone is determined to be compliant, at 360, then the specification related to the drone may be updated at 364. The drone specification may be updated, at 364, by appending or adding the test results to the specifications and instructing the updated specification be recorded. The drone specification may be updated, at 364, by updating the specification with a relationship generated based upon the observations and the compliance standard. For example, recording a status of the drone over time indicates the battery of the drone is prematurely getting weak, and the relationship is the battery is defective in comparison to the average battery life.

A statistical model of probabilities (a probabilistic model) may be generated through inspection of the drone consistent with disclosure. The statistical model may include a series of entries of other drones. The other drones may be related based on the serial numbers of the drones (e.g., like drones may be recorded as related test data entries). The other drones may be related based upon one or more components of the drones (e.g., dissimilar drones having an identical camera sensor). Repeated testing of the drone may take an initial value of a drone specification and may update the value with more real-world data. In a first example, a voltage between traces of a given drone may vary within a few millivolts after thirty drones of an identical model number are tested. Continuing the first example, the initial voltage value of the traces may be between 0.5 and 1 millivolts, and after the thirty drones are tested the updated value may be adjusted to 0.3 and 1.1 millivolts. The probabilistic model may further contain the probability distribution (e.g., stochastic variables) of a given observed characteristic. In a second example, the variance of propeller noise within 3 decibels is 80%. The probabilistic model may identify characteristics that cannot be relied upon solely to determine the compliance status of a given drone. Continuing the second example, the variance being 80% may indicate that maximum velocity of the drone is also required to fully determine the compliance standard.

After the drone is flagged, at 362, (or after the drone spec is updated at 364), method 300 ends.

Figure 4:
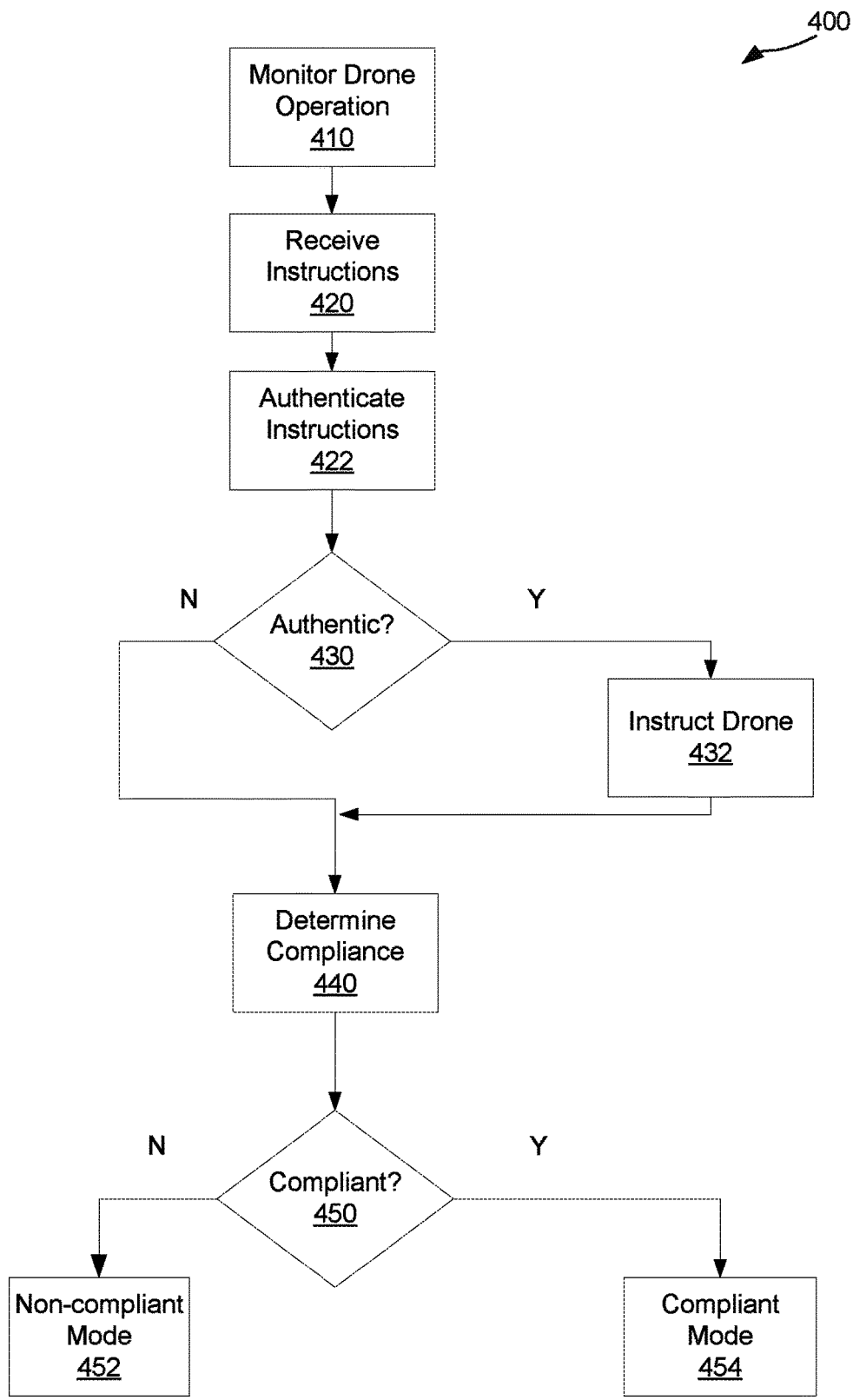
FIG. 4 depicts a method of self-compliance testing performed by one or more components of an example drone consistent with embodiments of the disclosure.

FIG. 4 depicts a method 400 of self-compliance testing performed by one or more components of an example drone consistent with embodiments of the disclosure. Method 400 may operate from a self-checker, such as a dedicated security integrated circuit. For example, by self-checker 230 as described in FIG. 2. One or more operations of method 400 may be performed periodically or continuously (e.g., every 5 seconds, based upon change of state by a component of the example drone, etc.). Method 400 may be initiated based on a communication from an external component of advanced drone testing (e.g., upon receiving power from the example drone, upon a drone inspection station providing a QR code indicating testing mode, from another drone, etc.). Method 400 may be performed by a computer client, such as computer 501 described in FIG. 5.

Method 400 begins by monitoring drone operation at 410. The drone may be in the middle of normal operating status, when the drone is monitored at 410. The drone may be monitored, at 410, based on one or more sensors located within the drone itself. In a first example, Hall effect sensors may monitor electricity, at 410, moving between a motor and a battery of the drone. In a second example, an on-chip gyroscopic sensor may monitor rotation, at 410, as the drone drives in a circle. The drone may be monitored, at 410, based on one or more external sensors located outside of the drone. For example, a geofence may be set up in a perimeter around a real-world environment and the drone may be monitored, at 410, by receiving position information from the geofence.

One or more instructions are received at 420. The instructions received at 420, may come from an external source. For example, an RF signal may come from an antenna of a drone inspection station, such as the drone inspection station 110 described in FIG. 1. The instructions received at 420, may be come from an internal source such as a secure element of the drone. The secure element may be read only. After the instructions are received, at 420, the instructions must be authenticated at 422. The instructions may be authenticated based on a key, password, or any other factor of identification. The key may be received at the same time as the instructions were received at 420. The key may be received after receiving the instructions at 420. The key may be received before receiving the instructions at 420. The key may be received on the same communication channel as the instructions (e.g., the key and the instructions may be sent along in an RF transmission). The key may be received in a different manner from communication of the instructions (e.g., the instructions may be received through a QR code being presented to a camera of the drone and the key may be transmitted through an infrared transmitter being presented to an IR sensor on the outside of the drone).

If the one or more instructions are authenticated, at 430, then the drone may be instructed at 432. The drone may be instructed, at 432, based solely on the instructions received at 420. For example, the instructions may say to move forward three feet, and the drone may be instructed to move forward three feet. The drone may be instructed, at 432, based on a combination of the instructions received, at 420, and internal testing logic on the drone. For example, the instructions may indicate the drone move forward, and the internal testing logic may additionally instruct the drone to move forward two feet or until within half a foot of an object. Instructing the drone, at 432, may also be based on tangential operations to the instructions received at 420. For example, the drone may be listening to commands from a drone operator before receiving the instructions, and as part of instructing the drone at 432, the internal testing logic may include a command to ignore the commands from the operator. The instructions may include one or more behaviors or operations to be performed by the drone. The internal testing logic may begin testing of the drone based on another condition, such as the drone entering a geofenced area dedicated to testing.

The compliance of the drone is determined at 440. The compliance may be determined, at 440, based on the operations of the drone, monitored at 410. The compliance of the drone may also be determined, at 440, based on the performed behaviors or operations that were caused by the drone being instructed at 432. The determination of compliance, at 440, may additionally be based on a comparison to a specification. The specification may include the behaviors of a drone in an un-modified stated (e.g., after manufacture, after repair or replacement of a broken component, etc.). The determination of compliance, at 440, may additionally be based on a comparison to government or local regulation. The determination of compliance, at 440, may further be based on one or more deterioration factors. For example, the specification may contain information related to a drone motor that indicates the EMF does not vary by more than 1% in decibels. Continuing the example, a first deterioration factor may indicate that the drones motor must have an EMF that varies 2% for every 100 hours of usage. Further continuing the example, determination of compliance, at 440, may include all of the following: the measured variance of EMF from an EMF sensor built into the drone, the 1% initial variance of decibels, the deterioration factor that modifies the variance based on hours, and the present usage hours of the drone. In another example, a local regulation might limit noise produced by a drone within a speed limit when operating in a city. And, the speed limit is enforced by other policing mechanism such as speed radar. Further continuing the example, determination of compliance, at 440, may include instructing the drone to operate in different speed ranges within the city speed limit, and sensor will be used to measure the noise level of the drone.

If the drone is determined to not be compliant, at 450, the drone is placed into non-compliant mode at 452 and method 400 ends. The non-compliant mode may be a reduction in the functionality of the drone. In a first example, reducing the resolution or increasing the compression of the file format of images captured by the drone's camera. In a second example, instructing the drone to ignore certain commands such as flying above a certain speed. In a third example, instructing the drone to utilize a previous version of firmware or software, such as the software that initially shipped on the drone. The non-compliant mode may be causing the drone to broadcast the non-compliance of itself, such as causing a light on the exterior of the drone to blink. If the drone is determined to be compliant, at 450, the drone is placed into a compliant mode at 454 and method 400 ends. The compliant mode, at 454, may increase the functionality of the drone. In a first example, if the drone was previously instructed to operate with reduced functionality or to cease moving during advanced drone testing, the drone may then be instructed to continue with whatever operation it was doing before at 454. In a second example, if the drone was previously instructed to ignore outside commands, at 432, the drone may be instructed to again listen for commands at 454.

FIG. 5 depicts the representative major components of an example computer system 501 that may be used, in accordance with embodiments of the present disclosure. It is appreciated that individual components may vary in complexity, number, type, and\or configuration. The particular examples disclosed are for example purposes only and are not necessarily the only such variations. The computer system 501 may comprise a processor 510, memory 520, an input/output interface (herein I/O or I/O interface) 530, and a main bus 540. The main bus 540 may provide communication pathways for the other components of the computer system 501. In some embodiments, the main bus 540 may connect to other components such as a specialized digital signal processor (not depicted).

The processor 510 of the computer system 501 may be comprised of one or more cores 512A, 512B, 512C, 512D (collectively 512). The processor 510 may additionally include one or more memory buffers or caches (not depicted) that provide temporary storage of instructions and data for the cores 512. The cores 512 may perform instructions on input provided from the caches or from the memory 520 and output the result to caches or the memory. The cores 512 may be comprised of one or more circuits configured to perform one or methods consistent with embodiments of the present disclosure. In some embodiments, the computer system 501 may contain multiple processors 510. In some embodiments, the computer system 501 may be a single processor 510 with a singular core 512.

The memory 520 of the computer system 501 may include a memory controller 522. In some embodiments, the memory 520 may comprise a random-access semiconductor memory, storage device, or storage medium (either volatile or non-volatile) for storing data and programs. In some embodiments, the memory may be in the form of modules (e.g., dual in-line memory modules). The memory controller 522 may communicate with the processor 510, facilitating storage and retrieval of information in the memory 520. The memory controller 522 may communicate with the I/O interface 530, facilitating storage and retrieval of input or output in the memory 520.

The I/O interface 530 may comprise an I/O bus 550, a terminal interface 552, a storage interface 554, an I/O device interface 556, and a network interface 558. The I/O interface 530 may connect the main bus 540 to the I/O bus 550. The I/O interface 530 may direct instructions and data from the processor 510 and memory 520 to the various interfaces of the I/O bus 550. The I/O interface 530 may also direct instructions and data from the various interfaces of the I/O bus 550 to the processor 510 and memory 520. The various interfaces may include the terminal interface 552, the storage interface 554, the I/O device interface 556, and the network interface 558. In some embodiments, the various interfaces may include a subset of the aforementioned interfaces (e.g., an embedded computer system in an industrial application may not include the terminal interface 552 and the storage interface 554).

Logic modules throughout the computer system 501— including but not limited to the memory 520, the processor 510, and the I/O interface 530—may communicate failures and changes to one or more components to a hypervisor or operating system (not depicted). The hypervisor or the operating system may allocate the various resources available in the computer system 501 and track the location of data in memory 520 and of processes assigned to various cores 512. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising: a processor identifying an unmanned vehicle,
wherein the identifying is performed based on comparing an image of the unmanned vehicle to one or more images of unmanned vehicle;
retrieving, in response to identifying the unmanned vehicle, one or more specifications of the identified unmanned vehicle;
observing a first characteristic of the unmanned vehicle;
comparing the observed first characteristic to the retrieved specifications;
determining, based on the comparison, a compliance standard of the unmanned vehicle.

2. The method of claim 1, wherein the compliance standard is also based on a deterioration factor of the unmanned vehicle, and wherein the method further comprises:
obtaining an age of one or more components of the unmanned vehicle; and
determining, based on the obtained age of the one or more components of the unmanned vehicle, a deterioration factor of the unmanned vehicle.

3. The method of claim 2, wherein a first component of the one or more components is a battery of the unmanned vehicle and the age is a number of charge cycles of the battery.

4. The method of claim 2, wherein a first component of the one or more components is a motor of the unmanned vehicle and the age is the number of hours the motor has been used.

5. The method of claim 2, wherein the method further comprises:
determining, based on the retrieved one or more specifications, a communication system of the identified unmanned vehicle; and
instructing, based on the determined communication system, the unmanned vehicle to perform the first characteristic.

6. The method of claim 1, wherein the first characteristic of the unmanned vehicle is an externally and non-intrusively determinable characteristic.

7. The method of claim 6, wherein the externally and non-intrusively determinable characteristic is selected from the group consisting of thermal, Hall effect, and sound.

8. The method of claim 1, wherein the first characteristic is the unmanned vehicle moving through an obstacle course.

9. The method of claim 1, wherein the first characteristic is the unmanned vehicle moving in a first direction and subsequently moving in a second direction, and wherein the compliance standard is based on how quickly the unmanned vehicle changes from moving in the first direction to moving in the second direction.

10. The method of claim 1, wherein the compliance standard is based on the noise level of the unmanned vehicle.

11. The method of claim 1, wherein the compliance standard is further based on an image and wherein the first characteristic is the unmanned vehicle capturing the image and wherein the observing the first characteristic includes inspecting one or more attributes of the image, and wherein the method further comprises:
presenting a subject to the unmanned vehicle for capture by a camera of the unmanned vehicle; and
receiving the image captured by the camera of the unmanned vehicle.

12. The method of claim 1, wherein the one or more specifications includes previous observations of the unmanned vehicle, and wherein the method comprises:
generating a relationship between the observed first characteristic and the determined compliance standard of the unmanned vehicle; and
updating the specification with the generated relationship.

13. The method of claim 1, wherein the determination is based on a second comparison, and wherein the method further comprises:
observing a second action of the unmanned vehicle; and
comparing the observed second action to the retrieved specification.

14. The method of claim 1, wherein the determination of the compliance standard of the unmanned vehicle is the unmanned vehicle being non-compliant with the one or more specifications.

15. The method of claim 14, wherein the method further comprises:
instructing, based on the determination of the unmanned vehicle being non-compliant, the unmanned vehicle to operate in a reduced functionality mode.

16. The method of claim 14, wherein the method further comprises:
flagging the unmanned vehicle as non-compliant.

17. The method of claim 16, wherein the method further comprises:
instructing the unmanned vehicle to broadcast that the unmanned vehicle is non-compliant with the one or more specifications.

18. The method of claim 14, wherein the method further comprises:
instructing the unmanned vehicle to move to a repair facility.

19. A system comprising:
a memory, the memory including one or more computer readable program instructions; and
a processor, the processor communicatively coupled to the memory, the processor in response to reading the one or more program instructions, configured to:
identify an unmanned vehicle, wherein the identifying is performed based on comparing an image of the unmanned vehicle to one or more images of unmanned vehicle;
retrieve, in response to identifying the unmanned vehicle, one or more specifications of the identified unmanned vehicle;
observe a first characteristic of the unmanned vehicle;
compare the observed first characteristic to the retrieved specifications; and
determine, based on the comparison, a compliance standard of the unmanned vehicle.

20. A computer program product comprising a non-transitory computer readable storage medium having program instructions embodied therewith, the program instructions executable by a computer to cause the computer to:

identify an unmanned vehicle, wherein the identifying is performed based on comparing an image of the unmanned vehicle to one or more images of unmanned vehicle;

retrieve, in response to identifying the unmanned vehicle, one or more specifications of the identified unmanned vehicle;

observe a first characteristic of the unmanned vehicle;

compare the observed first characteristic to the retrieved specifications; and determine, based on the comparison, a compliance standard of the unmanned vehicle.

\* \* \* \* \*